(12) United States Patent
Hadad

(10) Patent No.: US 7,512,409 B1
(45) Date of Patent: Mar. 31, 2009

(54) CELLULAR NETWORK SYSTEM

(75) Inventor: Zion Hadad, Rishon Lezion (IL)

(73) Assignee: Zion Hadad Communications Ltd., Rishon Lezion (IL)

( * ) Notice: Subject to any disclaimer, the term of this patent is extended or adjusted under 35 U.S.C. 154(b) by 0 days.

(21) Appl. No.: 09/482,030

(22) Filed: Jan. 13, 2000

(51) Int. Cl.
H04B 7/00 (2006.01)

(52) U.S. Cl. .................. 455/502; 455/447; 455/448; 455/450; 455/3.01; 455/63.1

(58) Field of Classification Search ............. 455/447, 455/448, 450, 451, 452.1, 454, 3.01, 503, 455/501, 502, 63.1, 67.11, 67.13
See application file for complete search history.

(56) References Cited

U.S. PATENT DOCUMENTS

| | | |
|---|---|---|
| 5,555,257 A | 9/1996 | Dent |
| 5,581,597 A | 12/1996 | Dent et al. |
| 5,619,503 A | 4/1997 | Dent |
| 5,621,720 A | 4/1997 | Bronte et al. |
| 5,631,898 A | 5/1997 | Dent |
| 5,657,358 A | 8/1997 | Panech et al. |
| 5,710,798 A | 1/1998 | Campana, Jr. |
| 5,812,955 A | 9/1998 | Dent et al. |
| 5,828,661 A | 10/1998 | Weaver, Jr. et al. |
| 5,867,478 A * | 2/1999 | Baum et al. .................. 370/203 |
| 5,898,904 A | 4/1999 | Wang |
| 5,926,479 A | 7/1999 | Baran |
| 5,930,679 A | 7/1999 | Olds et al. |
| 5,973,613 A | 10/1999 | Reis et al. |
| 6,091,932 A * | 7/2000 | Langlais ..................... 725/111 |
| 6,393,294 B1 * | 5/2002 | Perez-Breva et al. ..... 455/456.5 |

* cited by examiner

*Primary Examiner*—Temica M Beamer
(74) *Attorney, Agent, or Firm*—Smith Frohwein Tempel Greenlee Blaha, LLC; Gregory Scott Smith

(57) ABSTRACT

A method for providing a personalized bidirectional channel in broadcasting systems. In cellular broadcasting system the method contains the steps of: allocating a first group of subcarriers to broadcast transmission and a second group of subcarriers to personalized channels; reducing interference in the broadcast transmission by using equalizer; and reducing interference in the personalized channels by using controlled allocation of subcarriers in the second group to each subscriber. In OFDM broadcasting system the method contains the steps of: transmitting OFDM transmission from the base-station to the subscriber units; transmitting from the subscriber units to the base-station signals that are orthogonal to signals transmitted from the base-station; and receiving the orthogonal signals at the base-station.

12 Claims, 4 Drawing Sheets

CELLULAR NETWORK SYSTEM

FIELD OF THE INVENTION

This invention relates to cellular networks, and more particularly to improvements in Same Frequency Networks with means for reducing interference between cells in an interactive network.

BACKGROUND OF THE INVENTION

At present, Same Frequency Networks (SNF) are used to broadcast data to users using a cellular structure.

In each cell, a base station may use the Orthogonal Frequency Division Multiplex (OFDM) modulation for efficient transmission of digital signals. These signals may include video, voice and/or data. OFDM is a commonly used implementation of Multi-Carrier Modulation (MCM). The Orthogonal Frequency Division Multiplex (OFDM) is a modern advanced modulation method, that achieves better use of the frequency spectrum. Digital Video Broadcasting (DVB), for example, uses the OFDM system.

The cellular structure may be used to achieve better coverage of a geographical area, using lower power transmitters.

In a Multiple Frequency Network (MFN), each cell transmits at a frequency that is different from that of adjacent cells. This greatly reduces interference between cells because of the frequency separation. An MFN implementation, however, is not efficient in frequency spectrum utilization, since a large bandwidth is required—the total bandwidth of the system is a multiple of the bandwidth allocated to each transmitter (that is, the bandwidth of each base station).

Same Frequency Networks (SNF) achieve a much better utilization of the frequency spectrum, by allowing all the base stations to operate at the same frequency.

The base stations all transmit the same information and use the same frequency range. This achieves good frequency utilization, since each base station may be allocated the full bandwidth available in the network.

This SNF system may achieve a lower level of interference: If a subscriber receives signals from just one base station, there is no interference problem.

A possible interference problem may occur where a subscriber concurrently receives signals from two base stations or more. Interference in this case may be reduced using multipath signal enhancement techniques.

The signals broadcast from all base stations are identical, since they use the same frequency band to transmit the same information. Whilst a subscriber receiver is synchronized to one base station, signals from another base station appear as the same signal delayed in time, like multipath. The undesired multipath signal may be canceled or attenuated using channel equalizer means, like a transversal filter. A channel equalizer may be used to reduce interference from one or more base stations.

A possible problem in the above network is that it only works in one direction, for disseminating identical data to all subscribers. It may be desirable to implement an interactive network, in which users transmit back information to the base station, and a base station may transmit personalized information to each user.

Such an interactive network may found many uses. It may allow users to connect to the Internet, for example, or to ask for various personalized services, in addition to the common broadcast signals.

In an interactive network, the signals transmitted from the various base stations are different from each other. The above method for interference reduction is no more effective.

A channel equalizer cannot be used to reduce interference from base stations nearby, where the signals received from several base stations are different from each other.

A subscriber could use two receivers, one for the OFDM broadcast and a second receiver for personalized data, however that may be a costly solution having various disadvantages. It may also require separate transmitters in the base station.

Prior art patents apparently do not address the above problems in SFN. Thus, Dent, U.S. Pat. No. 5,555,257, details a cellular/satellite communications system with improved frequency re-use. It aims to minimize co-channel interference.

The system comprises a plurality of mobile stations in communication with a ground based station via an orbiting satellite. The orbiting satellite transponds a combination of signals received from the mobile stations to the ground station. At the ground station, the combined signals are processing using matrix models to separate the plurality of mobile station signals. The coefficients of the matrix are chosen to minimize interference between channels. Communication in the reciprocal direction proceeds in like manner. The system may include directional antennas.

Bronte et al., U.S. Pat. No. 5,621,720, discloses a multichannel alignment system and method. A DS3 level access, monitor and test system for a telephone network. The system provides selective, and hitless, bit overwrite in any of the embedded DS1, DS0 and subrate channels in a DS3 signal. Multiple DS0 and subrate channels can be tested via the asynchronous time slot interchange in conjunction with the recombiner of the present invention. A second embodiment of the invention partitions the system into a base subsystem, a communications link and a remote subsystem.

The distributed architecture system provides all of the performance monitoring and testing capabilities of the existing access system. The distributed architecture system provides a mechanism to transport a plurality of asynchronous and rate independent signals across the link to permit remote testing of digital and voice DS0 frequency circuits. In the preferred embodiment, the link that connects the base to the remote system is a standard DS1 channel. The clocks for the transmit and receive paths are derived from the same source, thus providing a common reference clock to both ends of the link.

Campana, Jr., U.S. Pat. No. 5,710,798, discloses a system for wireless transmission and receiving of information which is subject to fading by using a RF carrier modulated with a subcarrier modulated with the information. The system has a bus interface which communicates with a digital signal processor which controls the transmitting and receiving circuitry functions.

The digital signal processor provides first and second encoded information streams each comprising the information to be transmitted with the second stream being delayed by a time delay interval with respect to the first stream which is equal to or greater than the fading interval.

The first and second encoded information streams modulate cycles of the subcarrier to produce first and second parallel information streams which are time offset by the time delay interval.

The receiving circuitry has a detector for detecting transmitted first and second parallel information streams with the second parallel information stream being delayed from the first parallel information stream by the time delay interval. The digital signal processor determines if faded information is present in the frames of the detected first and second parallel information streams by processing the error correction code therein to determine if a number of bit errors are present which exceed the bit error correction capacity of the error correction code. The digital signal processor places an error marker within the detected first and second parallel information streams to mark each faded information unit and controls replacement of each error marker within at least one of the first and second parallel information streams with replacement data bits.

Dent, U.S. Pat. No. 5,631,898, discloses a cellular/satellite communications system with improved frequency re-use.

The system employs matrix processing of received and transmitted signals to minimize co-channel interference. It transmits signals to a plurality of remote units, using an updateable inverse C-matrix.

Panech et al., U.S. Pat. No. 5,657,358, discloses a subscriber RF telephone system for providing multiple speech and/or data signals simultaneously over either a single or plurality of RF channels.

It has a base station in communication with telephone lines and with mobile subscriber stations. The system comprises a switching matrix at the base station and set-up means at the subscriber stations. Means are provided for a periodic exchange of information during the course of communication operation concerning the present status for the connection between the base station and a subscriber station, the link quality, power, and timing adjustment thereof and providing adjustment to the subscriber station based thereupon.

Dent, U.S. Pat. No. 5,619,503, discloses a cellular/satellite communications system with improved frequency re-use, to minimize co-channel interference. A matrix processor is used to separate signals received from, or transmitted to, a plurality of mobile units. The coefficients of the matrix are chosen to minimize interference between channels, and are adjusted periodically.

The system rotates the allocation of Digital Voice Color Codes and sector radiation patterns in opposite directions to maintain the same color code in the same absolute direction.

Dent et al., U.S. Pat. No. 5,581,597, discloses a radio personal communications system and method for selecting a frequency for use in communications between a base station and a cellular terminal. Transceiver frequency and optionally power level are allocated to a radio personal communications system which includes a base station connected to a wire telephone network and a cellular terminal operating within a region of a wide area cellular network to minimize interference. The frequency for communications between the cellular terminal and the base station are optionally assigned by the operator of the wide area cellular network so appropriate frequencies and power levels can be assigned for base stations, to minimize same channel interference with the wide area cellular network.

Olds et al., U.S. Pat. No. 5,930,679, discloses a satellite-based ring alert apparatus and method of use. A fixed channel is defined wherein subscriber units are notified of incoming calls. Subscriber units monitor this ring alert channel and examine subscriber unit IDs transmitted in a ring alert message contained therein. When a subscriber unit determines from the subscriber unit ID that a call is being directed to it, it calls into a network to receive a call. Subscriber units also monitor this fixed channel to receive a control channel directory identifying the location of a subscriber unit's broadcast (control) channels.

Dent et al., U.S. Pat. No. 5,812,955, discloses a base station which relays cellular verification signals via a telephone wire network to verify a cellular radio telephone.

A secure radio personal communication system and method includes a base station which relays cellular verification signals between a wide area cellular network and a cellular terminal via the wire telephone network. Thus, cellular telephone calls which are routed to a cellular terminal via a base station, when the cellular terminal is within a local region covered by the base station, may be exchanged between the cellular network and cellular terminal over the wire telephone network.

Calls from the wide area cellular network which are routed through the base station can thus employ the same security systems and methods which are employed by the wide area cellular network.

Reis et al., U.S. Pat. No. 5,973,613, discloses a personal messaging system and method.

A pager device received paging messages. The user reads a paging message, selects one of a set of stored, predetermine reply messages, and transmits the selected reply message from the pager. The reply signal is received by one of a set of local cellular receivers, which sends the received signal to a computer for interpretation.

The pagers are associated with items located in a communication region that is interrogated by an interrogator on a one-to-many basis using broadcast commands, on a one-to-one basis using directed commands or on a combination basis using both methods.

Baran, U.S. Pat. No. 5,926,479, discloses a multiple protocol personal communications network system. A bi-directional communications system for bypassing a local exchange carrier telephone system for conveying data between at least one terminal unit and a switching unit. The system includes a relay transceiver where the signals from the terminal units are converted bi-directionally between the signal format of the terminal units and fixed length compliant ATM cells.

There can be at least two terminal units each designed to transmit and receive in different signal formats from each other and a programmable relay transceiver unit.

Weaver, Jr. et al., U.S. Pat. No. 5,828,661, discloses a method and apparatus for providing a cone of silence in a cellular communication system.

A remote unit communicates with another user via at least one base station. The network has a plurality of base stations controlled by a mobile switching center. Each base station of the plurality of base stations transmits an identifying pilot signal. To defining an area in which communication between a set of the base stations and the remote unit is forbidden, an auxiliary antenna transmits a silent region identifying pilot signal. The remote unit measures a signal strength of a set of identifying pilot signals corresponding to a neighbor set of base stations and measures a signal strength of the silent region identifying pilot signal. The remote unit sends a pilot strength measurement report to the mobile switching center via a first base station with which the remote unit has established communication.

Wang, U.S. Pat. No. 5,898,904, discloses a two-way wireless data network having a transmitter having a range greater than portions of the service areas. A two-way data network includes a broadcast control sub-network and a cellular data sub-network. The broadcast control sub-network includes a few high-power radio transmitters broadcasting into a large service area. The cellular data sub-network covers the large service area by a number of base stations each servicing a relatively small area. The broadcast control sub-network is used to notify the subscriber the receipt of a message.

In responding to the notification, the location of the subscriber's wireless terminal is make known, thereby eliminating conventional tasks such as location and mobility management tasks and allowing wireless terminals to be low power.

SUMMARY OF THE INVENTION

The present disclosure relates to a mixed mode OFDM, that is usable in SNF systems.

The mixed mode OFDM allows to implement an interactive system in SFN, while attenuating the interference from other base stations.

The OFDM modulation method offers certain advantages in modern communication. Moreover, OFDM specifies a two-channel system that could be used for the broadcast and personalized information.

It has been found by the present inventor, however, that OFDM is difficult to use in an interactive SNF system.

The OFDM standard specifies two interleaver stages: an outer interleaver and an inner interleaver.

Thus, the information common to all base stations is mixed with the personalized information for a specific user in such a way as to change the various parts of the spectrum of the broadcast signal.

There is common data that is broadcast by all base stations, however the personalized data that is shuffled all over the channel may generate large differences in the spectrum of transmissions from the various base stations. This makes it difficult to attenuate interference between base stations.

To address this problem, the present disclosure details a mixed-mode OFDM, wherein the personalized information is fed into the OFDM channel after the interleaver modules. This keeps the common data separate from the personalized data.

Moreover, the common data and the personalized data are treated differently in the system: Whereas the common data is allocated a fixed portion of the subcarriers in all the base stations, the personalized data is allocated different subcarriers in each base station.

Accordingly, the present invention allows two distinct ways to fight interference from other base stations:

1) Interference related to the common data is reduced using equalizer methods as known in the art.

2) Interference related to the personalized data is prevented or reduced by the allocation of different subcarriers in each base station. Further improvement is achievable using multipath cancellation methods. These methods are effective since they only combat multipath, not other transmissions.

The novel method is implemented with a system that combines the broadcast and personalized data in the frequency domain, prior to conversion to the time domain (OFDM processing) and transmission.

In the subscriber receiver, corresponding stages perform complementary steps to those in the transmitter.

The above processing may be implemented using just one receiver for both the OFDM broadcast and the personalized data, to achieve a lower cost and improved performance system. Only one transmitter is required in the base station for both the broadcast and personalized data. Both transmissions use the same antennas and processing.

According to another aspect of the invention, the signal to noise ratio ((S/N) in the link is further improved by using sectorial (high gain) antennas in the base station. These compensate for a lower power that may be used in the mobile unit. Thus, a good link performance may be achieved while the mobile unit transmits at a lower power.

According to yet another aspect of the invention, the crest factor (CF) in the mobile unit is dramatically reduced. This stems from the use of fewer subcarriers by the mobile unit. The reduced CF allows for a more effective transmission, with a lower peak to average power ratio.

The novel techniques in the present invention may be used in wireless cable TV and Internet/broadcast systems, for example.

Further objects, advantages and other features of the present invention will become obvious to those skilled in the art upon reading the disclosure set forth hereinafter.

DETAILED DESCRIPTION OF THE PREFERRED EMBODIMENTS

Figure 1:
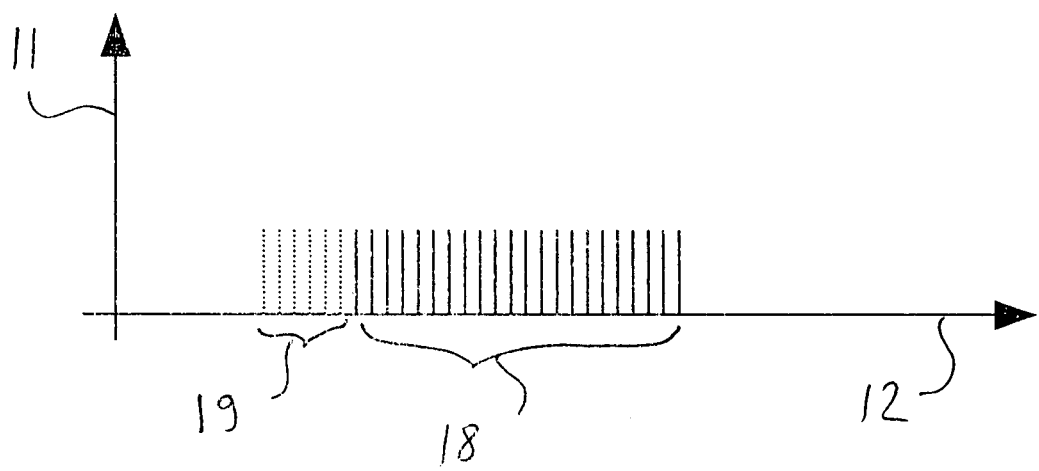
FIG. 1 illustrates the spectrum of a mixed mode OFDM signal.

A preferred embodiment of the present invention will now be described by way of example and with reference to the accompanying drawings. FIG. 1 illustrates the spectrum of a mixed mode OFDM signal in the frequency domain, with amplitude axis 11 and frequency axis 12.

The transmitted spectrum includes a broadcast spectrum 18 and a personalized data spectrum 19.

The common data and the personalized data are treated differently in the system: The common data is allocated a fixed portion of the subcarriers 18 in all the base stations, whereas the personalized data is allocated different subcarriers in each base station and for each user, for example by dividing the spectrum band 19.

This achieves lower interference in a SFN system, wherein interference in the broadcast band is reduced using one method and system, whereas interference in the personalized band is reduced with a second method and system, as detailed below.

The separation in frequency in band 19 is necessary between adjacent base stations and between users in the same location. For base stations that are farther apart from each other, the same frequencies may be reused, as the separate location prevents interference between these base stations. The same applies for subscribers in separate locations.

Thus, a SFN system may be used both for broadcasting and for personalized services, while keeping the interference between cells at reduced levels. The personalized data may include interactive services offered to each user, for example access to the Internet or personalized video or audio.

In a broadcast SFN system using OFDM transmission from a base station to subscriber units, the present invention teaches of means for achieving a bidirectional channel. These means include transmitting means in the subscriber units for a transmission of signals orthogonal to the signals transmitted from the base station, and receiving means in the base station for reception of said orthogonal signals. In the example as illustrated in FIG. 1, the orthogonality is achieved in the frequency domain with the broadcast signals using a first OFDM broadcast spectrum 18 and a second personalized data spectrum 19.

Wireless Cable TV allows to transmit TV programs or audio over wireless. The system and method disclosed in the present invention may be also used in these applications.

Wireless cable offers a lower cost communication solution over cable systems that require the installation and maintenance of a multitude of wideband cables.

In one embodiment for the personalized channel 19, each of the subscribers in a specific area may be allocated a separate subcarriers group. This will help prevent interference between users. This approach, however, may require a large total bandwidth.

In another embodiment of the personalized channel 19, a certain amount of overlap may be permitted between the subcarriers allocated to each of the subscribers in a specific area. This may result in some measure of interference between users. This approach, however, may achieve a significantly reduced total bandwidth.

The system designer or operator has thus the option of controlling the amount of interference and the total bandwidth using the abovedetailed trade-off.

Figure 2:
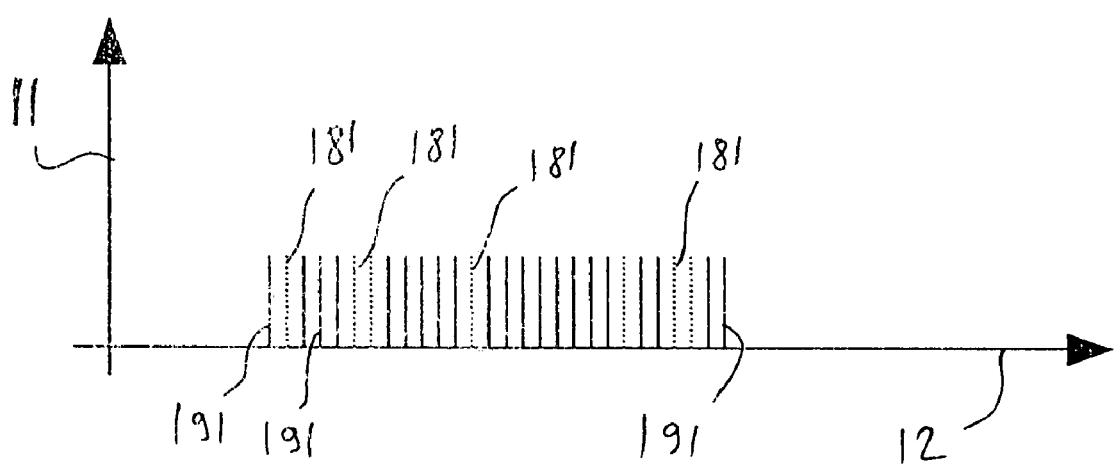
FIG. 2 illustrates the spectrum in another implementation of a mixed mode OFDM signal.

FIG. 2 illustrates the spectrum of a mixed mode OFDM signal for another implementation. The spectrum utilization is illustrated in the frequency domain, with amplitude axis 11 and frequency axis 12.

The transmitted spectrum includes a plurality of broadcast spectrum subcarriers 181, interspersed with a plurality of personalized data spectrum subcarriers 191.

In any case, the allocation of each subcarrier is known in advance, that is either to broadcast or to personalized data purposes. This allows the system to extract the parts of the spectrum belonging to each function and to treat them accordingly.

In one embodiment, each of the subscribers in a specific area may be allocated a separate group of subcarriers 191. This will help prevent interference between users. This approach, however, may require a large total bandwidth.

In another embodiment, a certain amount of overlap may be permitted between the subcarriers 191 allocated to each of the subscribers in a specific area. This may result in some measure of interference between users. This approach, however, may achieve a significantly reduced total bandwidth.

Figure 3:
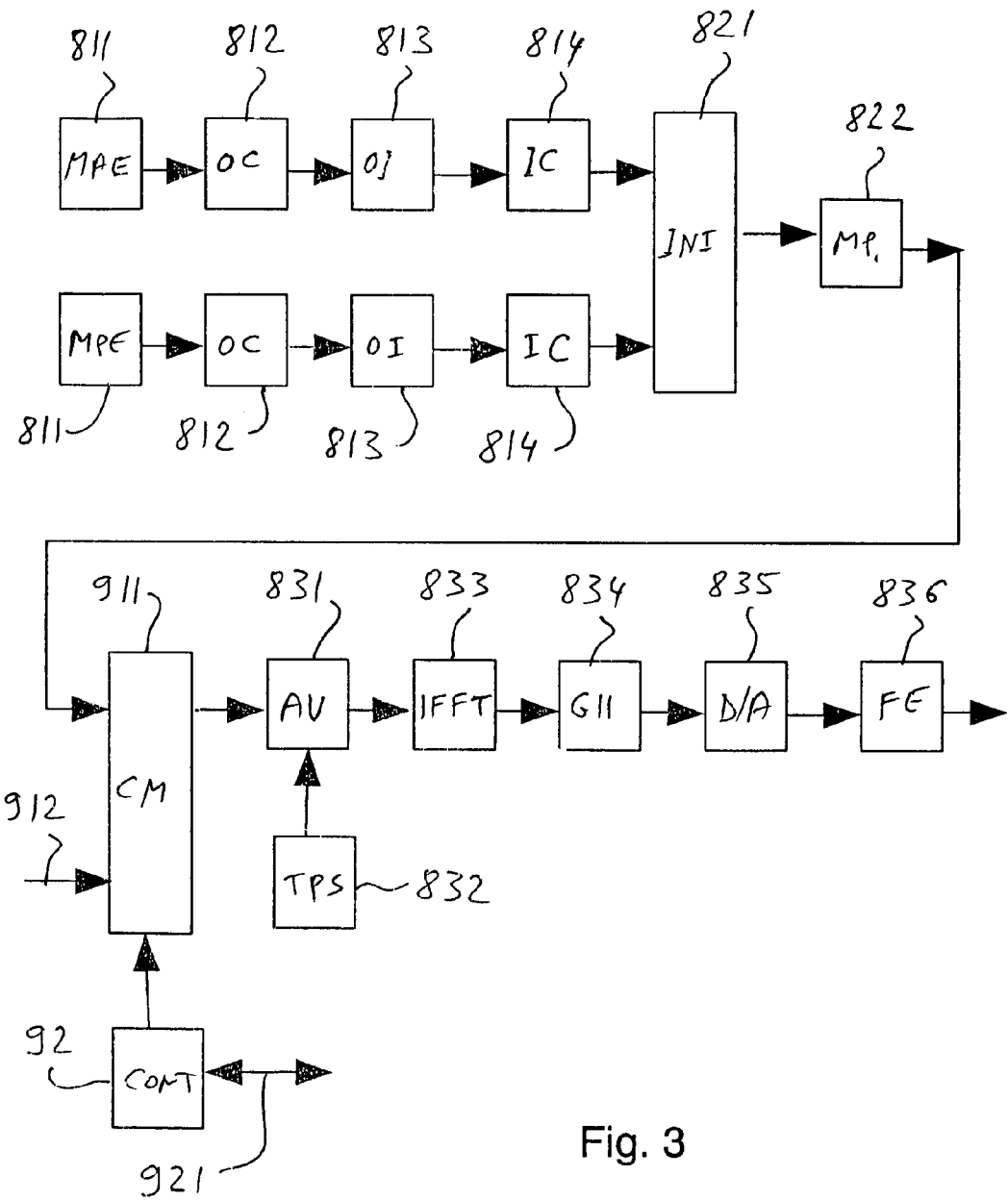
FIG. 3 illustrates the block diagram of a mixed mode OFDM transmitter.

FIG. 3 illustrates the block diagram of a mixed mode OFDM transmitter. A standard OFDM transmitter may include two input channels, each with a MUX adaptation energy dispersal 811 (two channels), an outer coder 812, an outer interleaver 813 and an inner coder 814. An inner interleaver 821 combines the two channels, followed by a mapper 822.

A conventional OFDM channel further includes frame adaptation unit 831, pilot and Transmission Parameters Signaling (TPS) signals 832, OFDM processor (IFFT) 833, guard interval insertion 834, Digital to Analog converter (D/A) 835 and a front end 836, connected to an antenna.

The above structure is adapted for broadcasting identical data to all subscribers.

A novel feature in this channel is the combiner means 911, that may be implemented for example using an interleaver. Means 911 combines the personalized data input channel 912 with the above broadcast data. This processing is done in the frequency domain. The broadcast data may be allocated the broadcast spectrum 18 illustrated in FIG. 1 above. The personalized data may be allocated the personalized data spectrum 19 or part thereof. In case several base stations in the same vicinity offer personalized services, each is allocated part of the spectrum range 19. The personalized bandwidth thus allocated may be adapted to requirements, using a dynamic allocation method. That is, where a transaction requires more bandwidth, it is allocated that bandwidth for the duration of that transaction.

A controller 92 may be used to allocate subcarriers to the personalized channel. A different set of subcarriers is allocated for each base station and subscriber, at least in base stations close to each other, where interference is expected.

Preferably, there are communication links 921 between controllers 92 in the various base stations, to allow coordinating the subcarrier allocation in each base station.

Thus, one difference from standard OFDM is the insertion of the personalized data channel 912 after the interleaver stages and in the frequency domain (that is, prior to the IFFT OFDM processing in unit 833). Moreover, the dynamic allocation of subcarriers to the personalized information is done such as to prevent interference with other base stations in the area.

Since the personalized data is inserted after the two interleaver stages, its spectrum will not alter the spectrum of the broadcast data. Therefore, the spectrum of broadband transmissions from the various base stations remains the same. The common data is kept separate from the personalized data. This allows to attenuate interference between base stations because of delayed reception of the broadcast signals. This is a mixed-mode OFDM.

Thus, the base stations in the broadcast SFN system includes means for separate processing of the transmit broadcast data and the transmit personalized data in the frequency domain. The processed broadcast and personalized data in the frequency domain are then combined. The resulting data undergoes conversion to the time domain for transmission.

The above system performs a frequency domain multiplexing of personalized data over a common channel. Other multiplexing means may be used to separate personalized communications from each other.

Figure 4:
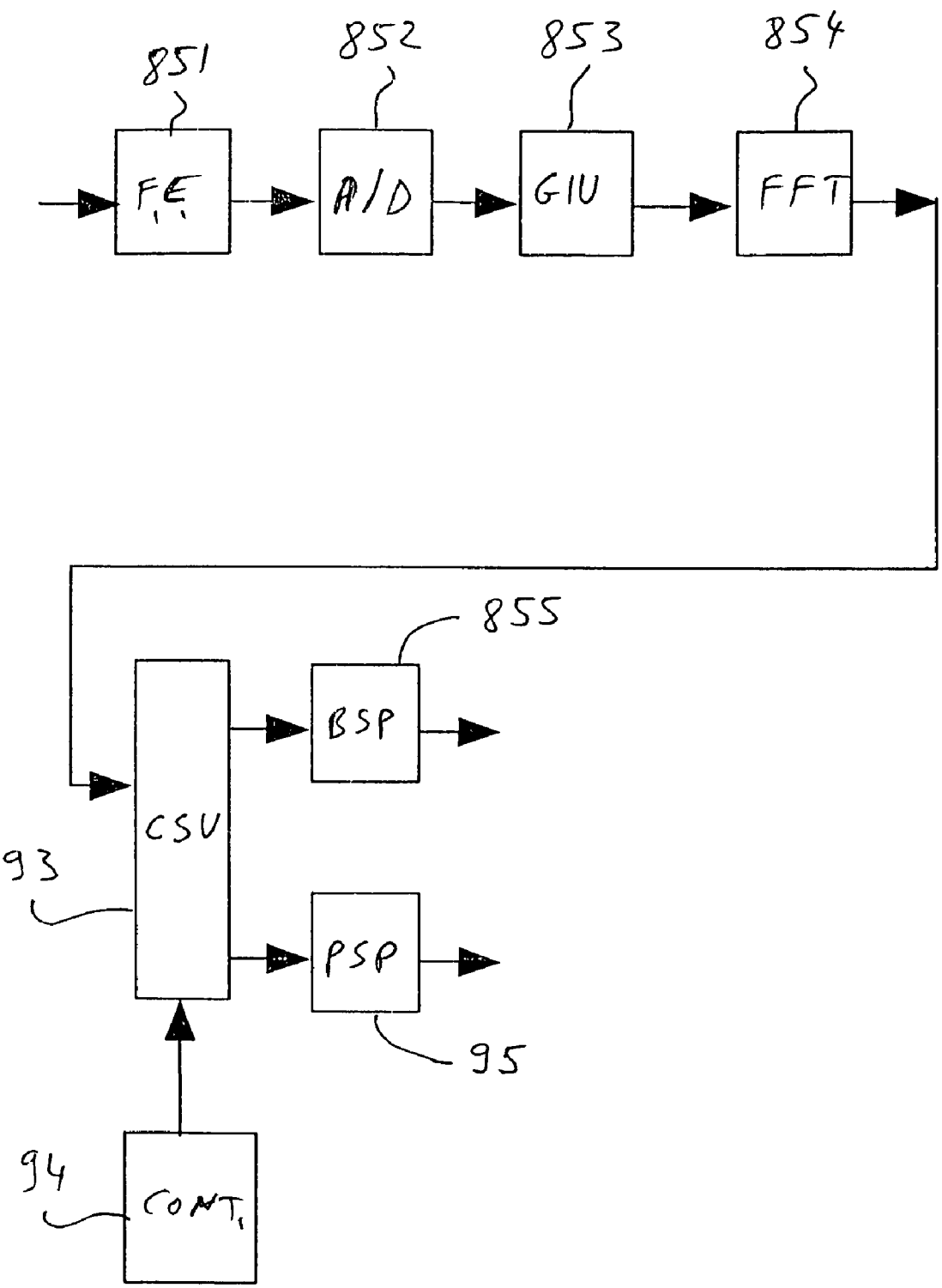
FIG. 4 illustrates the block diagram of a mixed mode OFDM receiver.

FIG. 4 illustrates the block diagram of a mixed mode OFDM subscriber receiver.

A front end 851 is connected to an antenna for receiving the mixed mode OFDM signals. The signal is converted to digital in an Analog to Digital converter (A/D) 852, followed by a guard interval unit 853 and an OFDM processor (FFT) 854. The above stages are used in prior art OFDM receivers.

A novel addition is the broadcast/personalized channels separation unit 93. In one embodiment, subcarriers out of the FFT processor 854 are separated according to the subcarriers allocation, as illustrated in FIG. 1 and as encoded in the transmitter detailed in FIG. 4.

The personalized data is separated from the broadcast data in the frequency domain (that is, after the OFDM processing).

A controller 94 may be used to separate the subcarriers that were allocated to the personalized channel for each subscriber. This allocation may be different for each base station and subscriber.

The broadcast data is transferred to the broadcast signal processor 855, and the personalized data is transferred to the personalized signal processor 95.

The broadcast signal processor 855 may include (not shown) a channel equalizer and other signal processing means. Channel equalization uses multipath cancellation, based on the fact that various base stations transmit identical data over the same frequency range. This assumption applies to the broadcast data only.

The signal processing includes stages (not shown) as defined in the OFDM standard and corresponding to the processing as illustrated in FIG. 3 above: inner deinterleaver, inner decoder, outer deinterleaver etc. If two channel data were transmitted, the receiver will separate the broadcast back into two channels. Frame adaptation may be performed as well.

Thus, the subscriber unit in the broadcast SFN system includes means for converting the received signals to the frequency domain. The resulting signal is then processed to separate the broadcast data and the personalized data in the frequency domain. The receiver then uses means for separate processing of the broadcast data and the personalized data in the frequency domain.

The personalized signal processor 95 may include (not shown) a channel equalizer and other signal processing means. Channel equalization uses multipath cancellation, based on the fact that other base stations in the vicinity will not transmit with the same subcarriers as the base station communicating with this subscriber.

Moreover, the base stations may use dynamic allocation of subcarriers for the personalized information to each subscriber, so as to prevent interference with other base stations in the area.

Thus, the system includes two separate means to fight interference from other base stations:

1) Interference related to the common (broadcast) data is reduced using equalizer methods and means in signal processor unit 855. These may include transversal filters as known in the art.

2) Interference related to the personalized data is prevented or reduced by the allocation of different subcarriers in each base station. Further improvement is achievable using multipath cancellation methods and means in signal processor 95.

Error detection and correction may be applied separately to the broadcast and the personalized channels.

Just one subscriber receiver is required to receive and process both the broadcast signals and the personalized signals from the base station. This achieves lower cost together with good performance.

In the abovedetailed system, it is possible to improve the Signal to Noise ratio (S/N) in link, using sectorial (high gain) antennas in the base station. This improves the link power budget, and allows each mobile user to transmit less power.

Moreover, the crest factor (CF) in mobile units is dramatically reduced.

The Crest Factor is defined as

CF=(Peak transmit power)/(Average transmit power)

As a signal has a wider bandwidth (that is, it includes more subcarriers) the CF increases.

Prior art systems had to reduce the transmit power, to prevent saturation in the linear transmit amplifier.

In the new mobile unit, the crest factor is reduced, so a higher average power may be transmitted. There is no need to keep the average power at lower levels to prevent saturation in the output amplifier.

An about 5-6 dB improvement in mobile transmitted power may be achieved, for example.

For example, a base station may transmit about 4,000 subcarriers. These may include about 2,000 subcarriers for the broadcast transmission and about 2,000 subcarriers for personalized transmissions to a plurality of mobile users. A mobile unit, however, has to transmit only about 64 subcarriers, that convey the personalized transmission from that user.

The greatly reduced number of subcarriers thus correspondingly reduces the CF for the mobile unit.

Result: a lower transmit power at the mobile unit is possible, for example a transmit power of about 200 mWatt (milliWatt). This power level is less than that in presently used TDMA systems.

In one possible implementation, the base station may transmit about 30 Mbit/sec (MegaBit/second), whereas a mobile unit may transmit about 64 kBit/sec (kiloBit/second) voice and 64 kBit/sec of data channel.

It will be recognized that the foregoing is but one example of an apparatus and method within the scope of the present invention and that various modifications will occur to those skilled in the art upon reading the disclosure set forth hereinbefore.

What I claim is:

1. In a SFN cellular broadcast system, means for implementing a bidirectional personalized channel with subscribers, comprising:
   A. means for allocating a first group of subcarriers to a broadcast transmission and a second group of subcarriers to personalized channels;
   B. Means for reducing interference in the broadcast channel using equalizer means;
   C. means for reducing interference in the personalized channel using a controlled allocation of subcarriers in the second group of each subscriber.

2. The SFN cellular broadcast system according to claim 1, wherein said system uses OFDM modulation means.

3. The SFN cellular broadcast system according to claim 1, wherein said controlled allocation of subcarriers in the second group comprises the allocation of separate subcarriers to each of the subscriber units that are close to each other.

4. The SFN cellular broadcast system according to claim 1, wherein said controlled allocation of subcarriers in the second group comprises a measure of overlap in the allocation of subcarriers to each of the subscriber units that are close to each other.

5. The SFN cellular broadcast system according to claim 1, wherein said interference reducing means further include multipath reducing means.

6. In a broadcast SFN system using OFDM transmission from a base-station to subscriber units, means for achieving a bidirectional channel comprising:
   transmitting means in the subscriber units for a transmission of signals orthogonal to signals transmitted from the base station, and
   receiving means in the base station for receiving the orthogonal signals; further including:
   means in the base station for separate processing of transmit broadcast data and transmit personalized data in the frequency domain, and means for combining the broadcast and personalized data in the frequency domain, prior to conversion to time domain for transmission.

7. In a broadcast SFN system using OFDM transmission from a base-station to subscriber units, means for achieving a bidirectional channel comprising:
   transmitting means in the subscriber units for a transmission of signals orthogonal to signals transmitted from the base station, and
   receiving means in the base station for receiving the orthogonal signals; further including:
   means in the subscriber unit for converting the received signals to the frequency domain, means for separating broadcast data and personalized data in the frequency domain, and means for separate processing of the broadcast data and the personalized data in the frequency domain.

8. In a broadcast SFN system using OFDM transmission from a base-station to subscriber units, means for achieving a bidirectional channel comprising:

transmitting means in the subscriber units for a transmission of signals orthogonal to signals transmitted from the base station, and receiving means in the base station for receiving the orthogonal signals; further including:

means in the base station for transmitting personalized data to each subscriber, comprising means for a transmission of signal orthogonal to broadcast signals and to the signals transmitted from the subscriber units.

9. In a broadcast SFN system using OFDM transmission from a base-station to subscriber units, means for achieving a bidirectional channel comprising:

transmitting means in the subscriber units for a transmission of signals orthogonal to signals transmitted from the base station, and receiving means in the base station for receiving the orthogonal signals;

wherein the transmitting means further includes a personalized data channel which is inserted after OFDM interleaver stages and in the frequency domain.

10. In a broadcast SFN system using OFDM transmission from a base-station to subscriber units, means for achieving a bidirectional channel comprising:

transmitting means in the subscriber units for a transmission of signals orthogonal to signals transmitted from the base station, and receiving means in the base station for receiving the orthogonal signals;

wherein the transmitting means further includes means for a dynamic allocation of subcarriers to personalized information.

11. In a broadcast SFN system using OFDM transmission from a base-station to subscriber units, means for achieving a bidirectional channel comprising:

transmitting means in the subscriber units for a transmission of signals orthogonal to signals transmitted from the base station, and receiving means in the base station for receiving the orthogonal signals;

wherein the transmitting means in the base station further includes means for separate processing of transmit broadcast data and transmit personalized data in the frequency domain.

12. The broadcast SFN system according to claim 11, further including means for combining the processed transmit broadcast data and transmit personalized data, and means for converting the resulting signal to a time domain prior to its transmission.

* * * * *